(12) United States Patent
Parry

(10) Patent No.: US 11,091,219 B2
(45) Date of Patent: Aug. 17, 2021

(54) SUSPENSION BICYCLE FRAME

(71) Applicant: UWHK Limited, Hong Kong (HK)

(72) Inventor: George Parry, Fort Collins, CO (US)

(73) Assignee: UWHK Limited, Hong Kong (HK)

(*) Notice: Subject to any disclaimer, the term of this patent is extended or adjusted under 35 U.S.C. 154(b) by 281 days.

(21) Appl. No.: 16/287,121

(22) Filed: Feb. 27, 2019

(65) Prior Publication Data

US 2019/0283837 A1 Sep. 19, 2019

Related U.S. Application Data

(60) Provisional application No. 62/645,038, filed on Mar. 19, 2018.

(51) Int. Cl.
*B62K 25/30* (2006.01)
*B62K 19/18* (2006.01)
(Continued)

(52) U.S. Cl.
CPC ............... *B62K 25/30* (2013.01); *B62K 3/02* (2013.01); *B62K 3/04* (2013.01); *B62K 19/18* (2013.01)

(58) Field of Classification Search
CPC . B62K 25/30; B62K 3/04; B62K 3/02; B62K 19/18; B62K 25/286
(Continued)

(56) References Cited

U.S. PATENT DOCUMENTS 4,515,236 A * 5/1985 Kanamori ............ B62K 25/286
180/227
4,596,302 A * 6/1986 Suzuki ................. B62K 25/286
180/227

(Continued)

FOREIGN PATENT DOCUMENTS

CN 86106821 A 3/1988
CN 105383617 A 3/2016
(Continued)

OTHER PUBLICATIONS

DE-102008011364-A1 (English translation of description) Obtained from Espacenet—(Year: 2021).*
(Continued)

*Primary Examiner* — Minnah L Seoh
*Assistant Examiner* — Myles A Harris
(74) *Attorney, Agent, or Firm* — Alleman Hall Creasman & Tuttle LLP

(57) ABSTRACT

A bicycle frame includes a front frame assembly and a rear frame assembly pivotably connected to the front frame assembly. The front frame assembly includes a bottom bracket shell, a seat tube extending from the bottom bracket shell toward a saddle support, and a forward shock attachment point statically located on the seat tube between the bottom bracket shell and the saddle support. The rear frame assembly includes a chain stay fork including a chain stay yoke. A chain stay extends from the chain stay yoke to a rear wheel forkend. The chain stay fork includes a rearward shock attachment point statically located on the chain stay yoke. The forward shock attachment point and the rearward shock attachment point cooperate to position a suspension shock between the front frame assembly and the rear frame assembly behind the seat tube.

20 Claims, 6 Drawing Sheets

(51) Int. Cl.
*B62K 3/02* (2006.01)
*B62K 3/04* (2006.01)

(58) Field of Classification Search
USPC .......................................................... 280/284
See application file for complete search history.

(56) References Cited

U.S. PATENT DOCUMENTS

| | | | | |
|---|---|---|---|---|
| 4,789,174 | A * | 12/1988 | Lawwill | B62K 25/14 280/284 |
| 5,628,524 | A * | 5/1997 | Klassen | B62K 25/286 280/283 |
| 5,791,674 | A * | 8/1998 | D'Aluisio | B62K 25/286 180/227 |
| 6,029,990 | A * | 2/2000 | Busby | B62K 25/286 280/261 |
| 6,793,230 | B1 * | 9/2004 | Cheng | B62K 25/286 280/283 |
| 7,556,276 | B1 * | 7/2009 | Dunlap | B62K 25/286 280/284 |
| 8,430,417 | B1 * | 4/2013 | Galson | B62K 25/30 280/284 |
| 8,590,914 | B2 | 11/2013 | Domahidy | |
| 8,770,608 | B1 | 7/2014 | Chamberlain | |
| 10,850,796 | B2 * | 12/2020 | Chamberlain | B62K 19/18 |
| 2002/0109332 | A1 * | 8/2002 | Ellsworth | B62K 25/30 280/284 |
| 2003/0193163 | A1 * | 10/2003 | Chamberlain | B62K 3/04 280/284 |
| 2004/0094933 | A1 * | 5/2004 | Probst | B62K 25/286 280/284 |
| 2006/0071442 | A1 * | 4/2006 | Hoogendoorn | B62K 25/286 280/275 |
| 2007/0108725 | A1 * | 5/2007 | Graney | B62K 25/286 280/284 |
| 2009/0026728 | A1 * | 1/2009 | Domahidy | B62K 25/286 280/284 |
| 2010/0109282 | A1 * | 5/2010 | Weagle | B62K 25/286 280/284 |
| 2011/0187078 | A1 | 8/2011 | Higgon | |
| 2011/0193316 | A1 | 8/2011 | Earle | |
| 2014/0265208 | A1 * | 9/2014 | Voss | B62K 25/28 280/210 |
| 2015/0069735 | A1 * | 3/2015 | Hoogendoorn | B62K 25/28 280/284 |
| 2017/0334505 | A1 | 11/2017 | Zawistowski | |
| 2018/0037295 | A1 * | 2/2018 | Beale | B62K 25/30 |
| 2018/0265164 | A1 * | 9/2018 | Li | B62K 19/34 |
| 2018/0265165 | A1 * | 9/2018 | Zawistowski | B62K 25/286 |
| 2018/0273136 | A1 * | 9/2018 | Voss | B62K 25/283 |
| 2020/0031426 | A1 * | 1/2020 | Voss | B62K 19/02 |

FOREIGN PATENT DOCUMENTS

| | | | |
|---|---|---|---|
| DE | 29513074 | U1 | 11/1995 |
| DE | 4435482 | A1 | 4/1996 |
| DE | 20114197 | U1 | 12/2001 |
| DE | 102008011364 | A1 * | 9/2009 .......... B62K 25/286 |
| DE | 202011004542 | U1 * | 6/2011 |
| DE | 102010010662 | A1 * | 9/2011 .......... B62K 25/286 |
| EP | 3025948 | B1 | 11/2017 |
| FR | 2873089 | A1 * | 1/2006 |
| WO | WO-2005030565 | A1 * | 4/2005 |
| WO | 2017091516 | A3 | 6/2017 |

OTHER PUBLICATIONS

DE-102010010662-A1 (English translation of description) Obtained from Espacenet—(Year: 2021).*
European Patent Office, Extended European Search Report Issued in Application No. 19163372.6, dated May 8, 2019, Germany, 10 pages.

* cited by examiner

SUSPENSION BICYCLE FRAME

CROSS REFERENCE TO RELATED APPLICATIONS

This application claims priority to U.S. Provisional Application No. 62/645,038, filed Mar. 19, 2018, the entirety of which is hereby incorporated herein by reference for all purposes.

BACKGROUND

Bicycles may include a suspension system to improve rideability over rough terrain. Some bicycles incorporate shocks that provide suspension for the front and/or rear wheels.

SUMMARY

A bicycle frame includes a front frame assembly and a rear frame assembly pivotably connected to the front frame assembly. The front frame assembly includes a bottom bracket shell, a seat tube extending from the bottom bracket shell toward a saddle support, and a forward shock attachment point statically located on the seat tube between the bottom bracket shell and the saddle support. The rear frame assembly includes a chain stay fork including a chain stay yoke. A chain stay extends from the chain stay yoke to a rear wheel forkend. The chain stay fork includes a rearward shock attachment point statically located on the chain stay yoke. The forward shock attachment point and the rearward shock attachment point cooperate to position a suspension shock between the front frame assembly and the rear frame assembly behind the seat tube.

DETAILED DESCRIPTION

Figure 1:
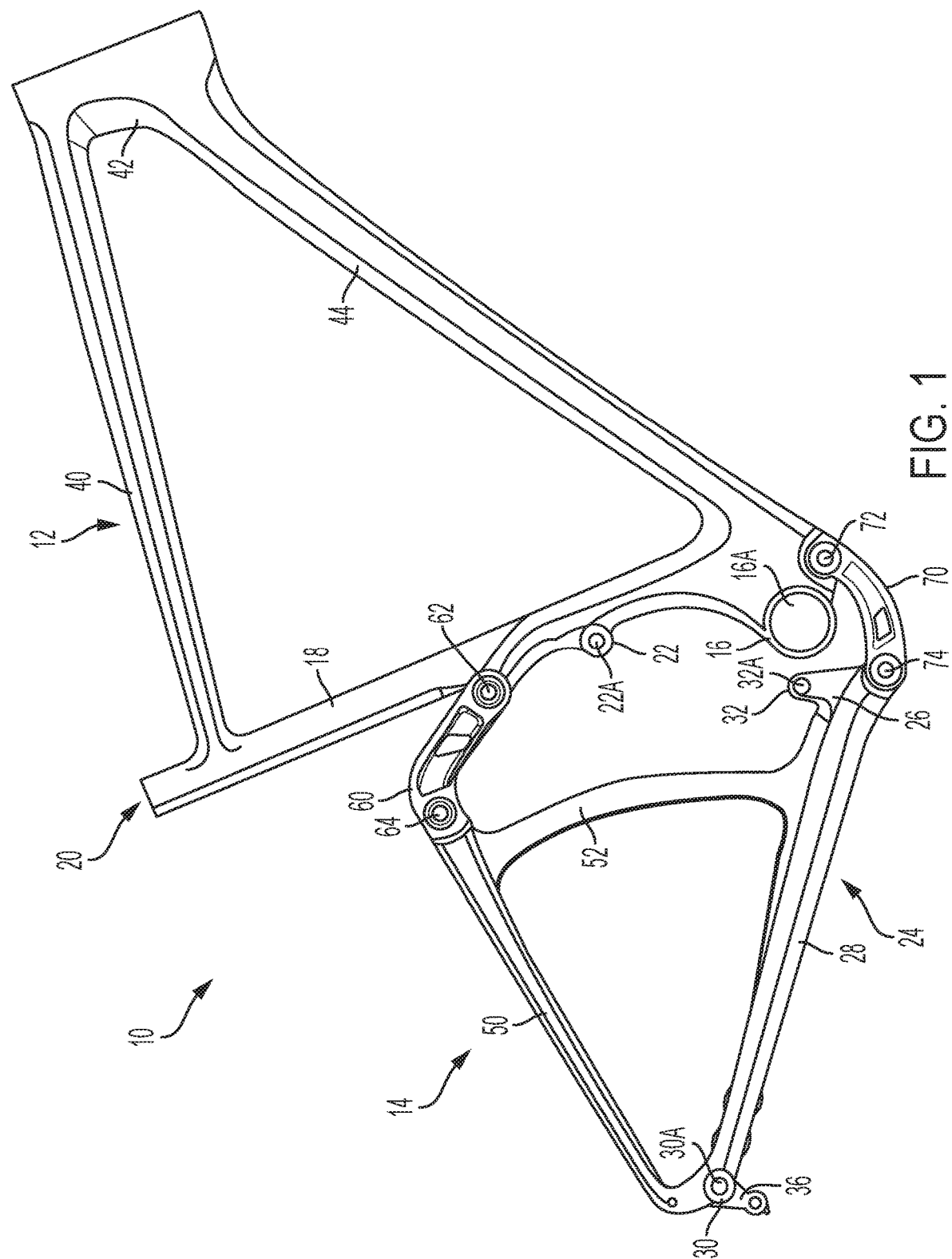
FIG. 1 depicts a first view of an example bicycle frame.

U.S. Pat. No. 8,590,914, the entirety of which is hereby incorporated herein by reference for all purposes, discloses a mountain bicycle frame that includes a front frame assembly pivotably connected to a rear frame assembly via top and bottom linkages. As shown in FIGS. 1-6, the present disclosure is also directed to a bicycle frame 10 that includes a front frame assembly 12 pivotably connected to a rear frame assembly 14 via a top linkage 60 and a bottom linkage 70. However, bicycle frame 10 of the present disclosure is designed to position a suspension shock 34 (depicted in FIG. 3) behind a seat tube 18 of front frame assembly 12, whereas U.S. Pat. No. 8,590,914 positions its suspension shock in front of its seat tube. Front frame assembly 12 includes a top tube 40, a head tube 42, a down tube 44, and seat tube 18 that collectively define a front "triangle". By positioning suspension shock 34 behind seat tube 18, the front triangle of front frame assembly 12 can remain open, thus providing room for two or more water bottles or a full-size frame bag.

In an example of front frame assembly 12, top tube 40 is statically connected to seat tube 18, head tube 42 is statically connected to top tube 40, and down tube 44 is statically connected to head tube 42. Front frame assembly 12 may further include a bottom bracket shell 16 that defines a crank region 16A within which a crank system is mounted. While in this example, bottom bracket shell 16 completely surrounds crank region 16A within a plane that is parallel to a direction of travel of bicycle 10, in another example bottom bracket shell 16 may only partially surround a crank region or may form a bottom bracket having an attachment surface upon which a modular crank system may be mounted. Down tube 44 is statically connected to one or both of seat tube 18 and bottom bracket shell 16.

Front frame assembly 12 takes the form of a unified front frame assembly in which a relative position of forward shock attachment point 22 and a bottom bracket shell 16 does not change. In other words, there are no pivots or movable linkages that cause forward shock attachment point 22 to pivot or move relative to the bottom bracket shell 16. In this configuration, forward shock attachment point 22 may be referred to as being statically located relative to bottom bracket shell 16. It should be understood that there may be minor movements based on flexing of frame materials (e.g., seat tube flex). Further, the shock may itself pivot relative to the forward shock attachment point 22, e.g., about a forward shock axle. In an example, forward shock attachment point 22 is statically located on seat tube 18 between bottom bracket shell 16 and a saddle support 20. Forward shock attachment point 22 may define an opening 22A (i.e., an eye) to which a forward portion of suspension shock 34 is mounted, such as via a forward shock axle.

Front frame assembly 12 further includes a forward top linkage attachment point 62 to which a forward portion of top linkage 60 is mounted, and a forward bottom linkage attachment point 72 to which a forward portion of bottom linkage 70 is mounted. In the example depicted in FIG. 1, forward bottom linkage attachment point 72 is located forward of bottom bracket shell 16, and bottom linkage 70 passes under the bottom bracket shell. However, other suitable configurations may be used, including a forward bottom linkage attachment point that is directly beneath or rearward of bottom bracket shell 16.

Rear frame assembly 14 includes a chain stay fork 24. Chain stay fork 24 includes a chain stay yoke 26 and a chain stay 28 extending from the chain stay yoke to a rear wheel forkend 30. Rear wheel forkend 30 includes or forms an opening 30A that accommodates a rear axle. FIG. 1 further depicts a rear derailleur hanger 36 mounted to rear wheel forkend 30. Rear frame assembly 14 further includes a seat stay fork 50 that is statically connected to the rear wheel forkend 30. In an example, rear frame assembly 14 may further include a bridge stay 52 statically connected to seat stay fork 50 and chain stay fork 24.

Rear frame assembly 14 takes the form of a unified rear frame assembly in which a relative position of the rearward shock attachment point 32 and the rear wheel forkend 30 (e.g., a through-axle (thru-axle) holder) does not change. In other words, there are no pivots or movable linkages that cause rearward shock attachment point 32 to pivot or move relative to rear wheel forkend 30. In this configuration, rearward shock attachment point 32 may be referred to as being statically located relative to rear wheel forkend 30. It should be understood that there may be minor movements based on flexing of frame materials (e.g., chain stay flex). Further, the shock may itself pivot relative to the rearward shock attachment point 32, e.g., about a rearward shock axle. In some embodiments, the unified rear triangle includes plural constituent parts bonded together.

Rear frame assembly 14 further includes a rear top linkage attachment point 64 to which a rearward portion of top linkage 60 is mounted, and a rear bottom linkage attachment point 74 to which a rearward portion of bottom linkage 70 is mounted.

Figure 2:
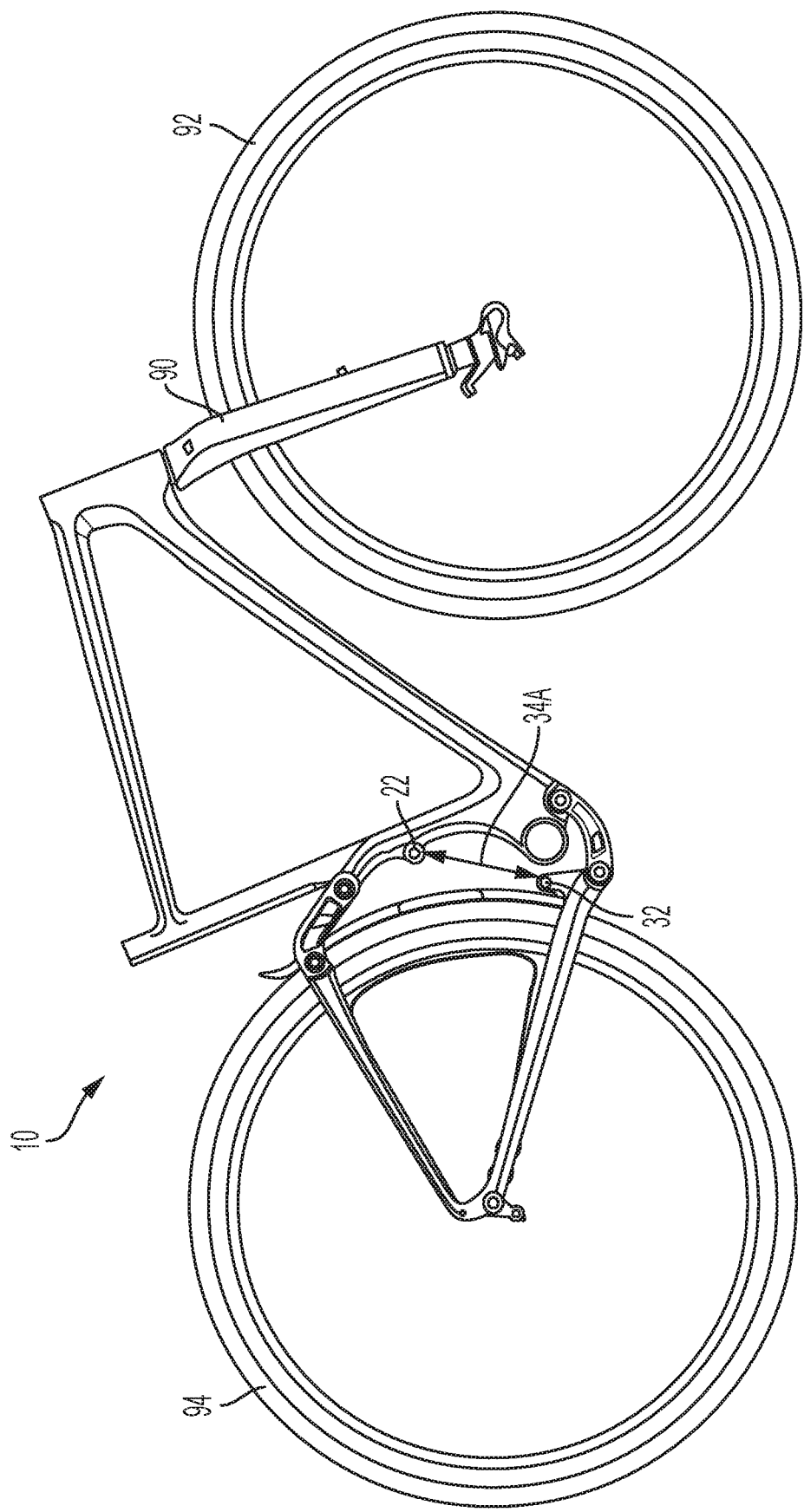
FIG. 2 depicts a second view of the bicycle frame of FIG. 1 with addition of a front fork, and front and rear wheels.

FIG. 2 depicts a second view of bicycle frame 10 of FIG. 1 with addition of a front fork 90, a front wheel 92, and a rear wheel 94. FIG. 2 further depicts a suspension region defined by a distance 34A within which suspension shock 34 may be mounted. During operation of bicycle frame 10, distance 34A between forward shock attachment point 22 and rearward shock attachment point 32 expands and contracts as suspension shock 34 absorbs and dampens shock impulses. In an example, distance 34A is approximately 160 mm eye to eye (i.e., from a center of opening 22A to a center of opening 32A) at 0% sag and approximately 140 mm fully compressed. In this configuration, a leverage ratio of bicycle frame 10 of approximately 2.5 would provide 50 mm of vertical rear axle travel (e.g., at opening 30A). However, other suitable configurations may be used.

Figure 3:
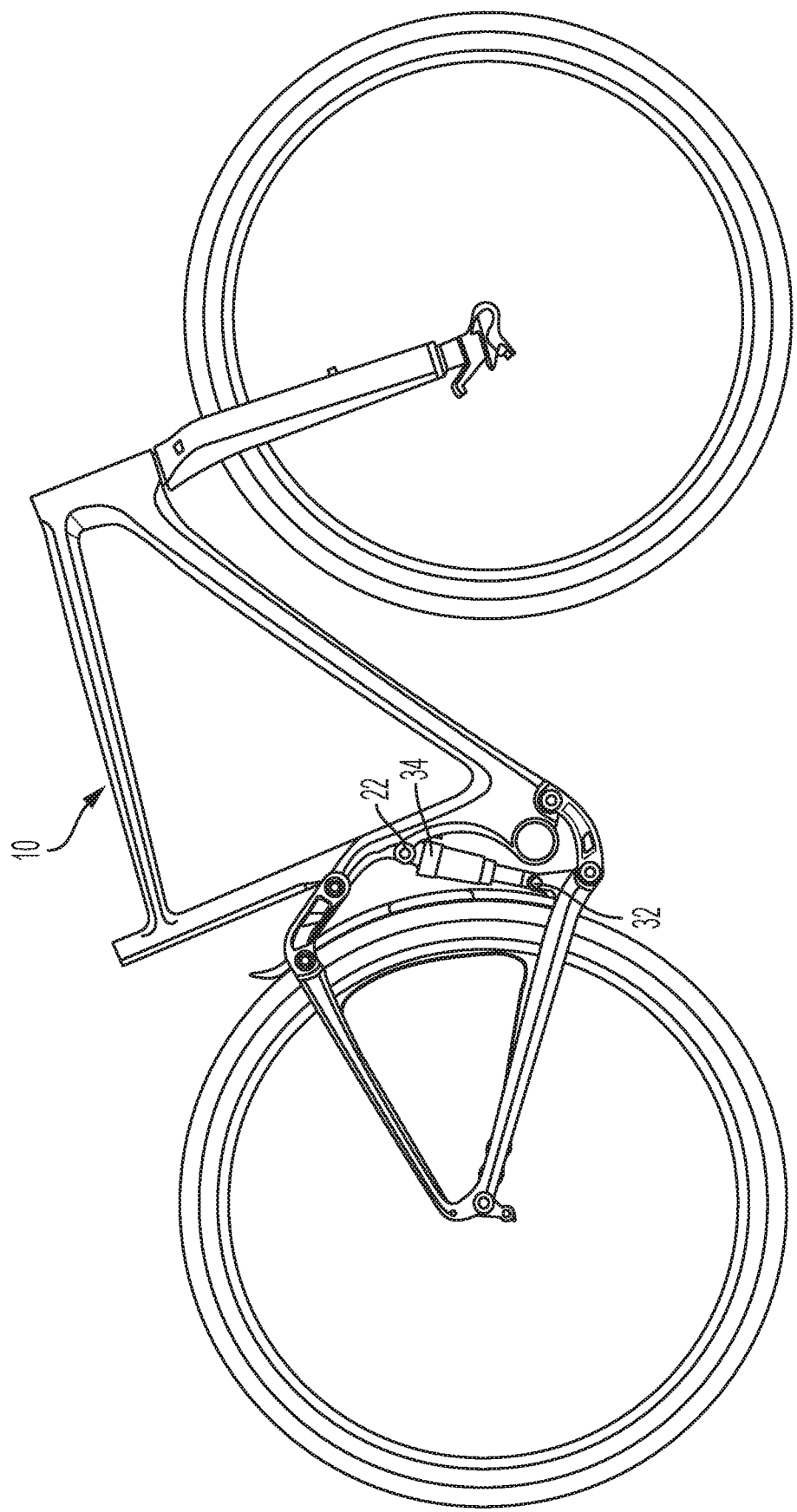
FIG. 3 depicts a third view of the bicycle frame depicted in FIG. 1 with a suspension shock positioned between the front frame assembly and the rear frame assembly.

FIG. 3 depicts a third view of bicycle frame 10 depicted in FIG. 1 with a suspension shock positioned between the front frame assembly and the rear frame assembly. As depicted in FIG. 3, forward shock attachment point 22 and rearward shock attachment point 32 cooperate to position suspension shock 34 between front frame assembly 12 and rear frame assembly 14 behind seat tube 18.

Figure 4:
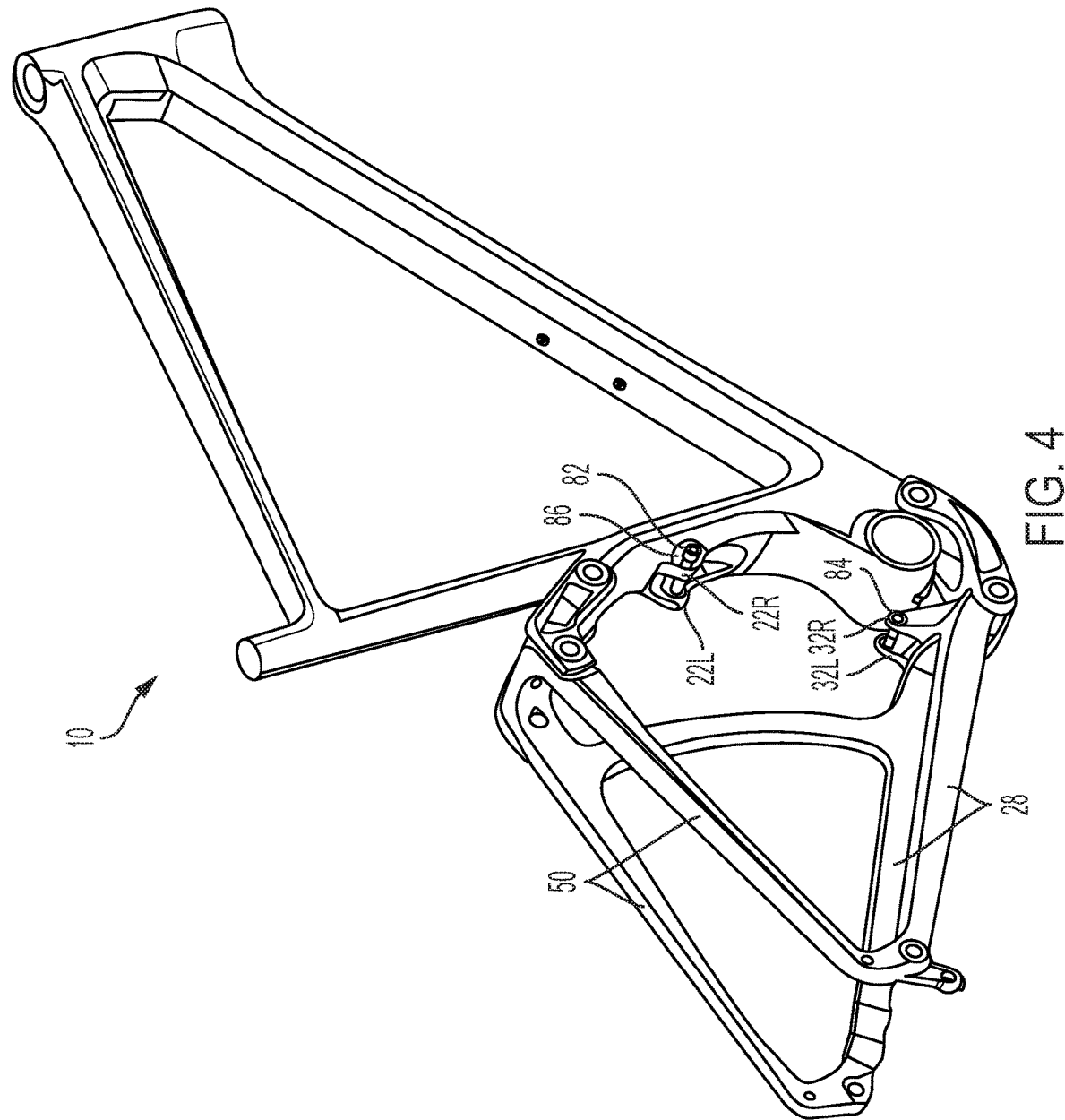
FIG. 4 depicts a fourth view of the bicycle frame of FIG. 1.

FIG. 4 depicts a fourth view of bicycle frame 10 of FIG. 1. Respective left and right-sides of seat stay fork 50 and chain stay fork 24 are depicted in FIG. 4. Furthermore, in this example, a bridge stay (e.g., bridge stay 52 of FIG. 1) is statically connected to a left-side of seat stay fork 50 and a left-side of chain stay fork 24. Additionally or alternatively, a bridge stay (e.g., bridge stay 52) may be statically connected to a right-side of seat stay fork 50 and right-side of chain stay fork 24 (e.g., if positioned to avoid drive-chain obstruction). In yet another example, bridge stays may be omitted from rear frame assembly 14.

FIG. 4 further depicts an example in which forward shock attachment point 22 includes a right-side forward shock attachment point 22R and a left-side forward shock attachment point 22L that each accommodate forward shock axle 82 of suspension shock 34. In this example, attachment points 22R and 22L are spaced apart from each other relative to a plane that is parallel to a direction of travel of the bicycle to accommodate a forward yoke portion of suspension shock 34 therebetween. FIG. 4 further depicts an example in which seat tube 18 includes a recessed region 86 within which an end of forward shock axle 82 may reside to thereby reduce undesirable contact between a crank and the forward shock axle. Another recessed region similar to recessed region 86 may be provided on a left-side of seat post 18 within which another end of forward shock axle 82 may reside.

FIG. 4 further depicts an example in which rearward shock attachment point 32 includes a right-side rearward shock attachment point 32R and a left-side rearward shock attachment point 32L that each accommodate rearward shock axle 84 of suspension shock 34. In this example, attachment points 32R and 32L are spaced apart from each other relative to a plane that is parallel to a direction of travel of the bicycle to accommodate a rearward yoke portion of suspension shock 34 therebetween.

Figure 5:
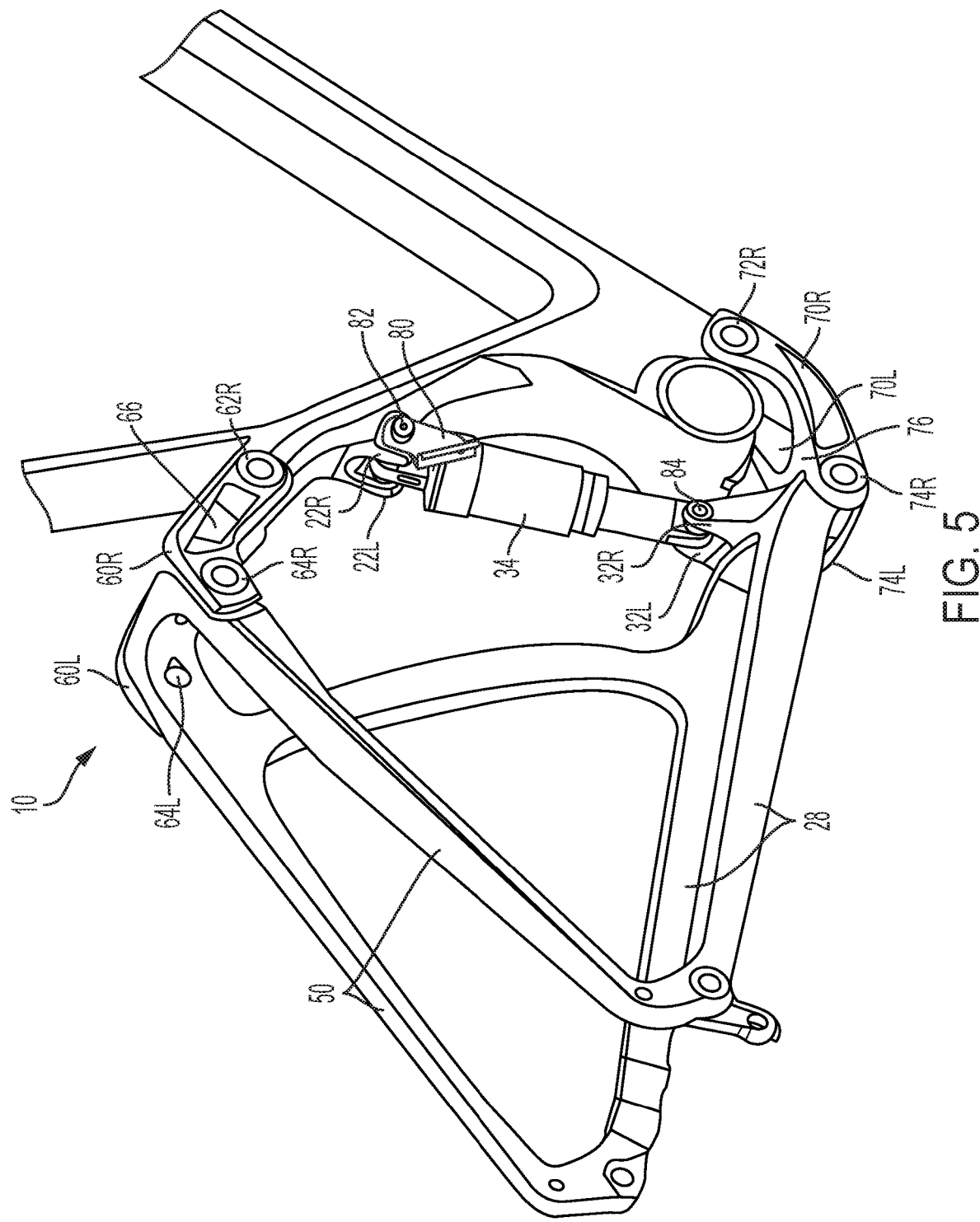
FIG. 5 depicts a fifth view of the bicycle frame of FIG. 1 with the suspension shock positioned between the front frame assembly and the rear frame assembly.
Figure 6:
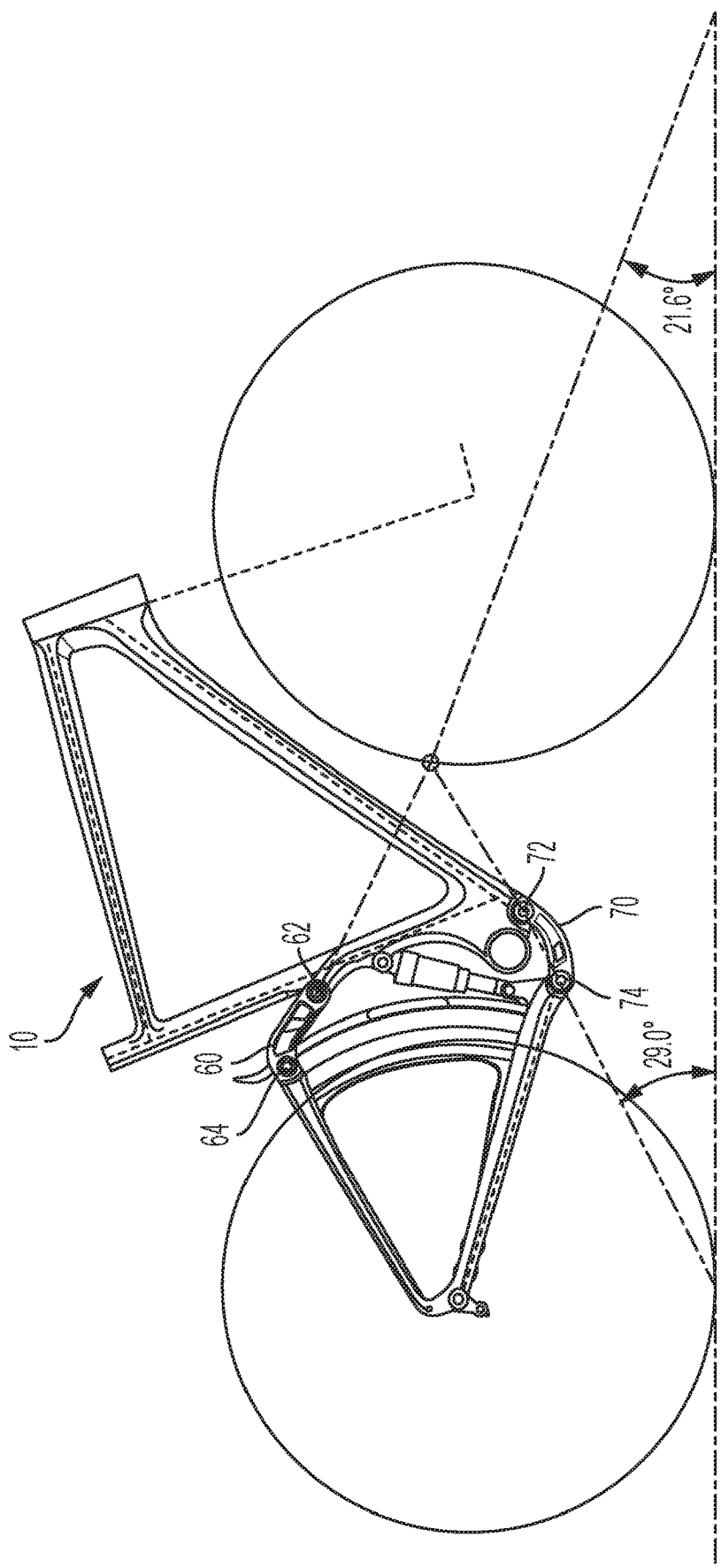
FIG. 6 depicts a sixth view of the bicycle frame of FIG. 1 with example geometry.

FIG. 5 depicts a fifth view of bicycle frame 10 of FIG. 1 with suspension shock 34 positioned between front frame assembly 12 and rear frame assembly 14. In the example depicted in FIG. 5, top linkage 60 that pivotably connects front frame assembly 12 and rear frame assembly 14 includes a right-side top linkage 60R and a left-side top linkage 60L that are joined to each other by a cross member 66. In this configuration, top linkage 60 generally forms an "H" shape. In an example, cross member 66 is symmetrical about a plane that is parallel to a direction of travel of the bicycle. In another example, cross member 66 is asymmetrical about a plane that is parallel to a direction of travel of the bicycle such that a right-side of cross member 66 is forward or rearward of a left-side of cross member 66. An asymmetrical configuration may provide additional clearance on a particular side of the bicycle with respect to cross member 76.

As further depicted in FIG. 5, right-side top linkage 60R is pivotably connected to front frame assembly 12 at a right-side forward top linkage attachment point 62R and is pivotably connected to rear frame assembly 14 at a right-side rearward top linkage attachment point 64R. Similarly, left-side top linkage 60L is pivotably connected to rear frame assembly 14 at a left-side rearward top linkage attachment point 64L and is pivotably connected to front frame assembly 12 at a left-side frontward top linkage attachment point (not visible in FIG. 5). A removable front derailleur hanger 80 may be removably connected to forward shock axle 82 secured by forward shock attachment point 22.

Furthermore, in the example depicted in FIG. 5, bottom linkage 70 that pivotably connects front frame assembly 12 and rear frame assembly 14 includes a right-side bottom linkage 70R and a left-side bottom linkage 70L that are joined to each other by a cross member 76. In this configuration, bottom linkage 70 generally forms an "H" shape. In an example, cross member 76 is symmetrical about a plane that is parallel to a direction of travel of the bicycle. In another example, cross member 76 is asymmetrical about a plane that is parallel to a direction of travel of the bicycle such that a right-side of cross member 76 is forward or rearward of a left-side of cross member 76—e.g., the right-side of cross member 76 joining right-side bottom linkage 70R may be closer to forward bottom linkage attachment point 72 as compared to the left-side of cross member 76 joining left-side bottom linkage 70L. An asymmetrical configuration may provide additional clearance on a particular side of the bicycle with respect to cross member 76.

As further depicted in FIG. 5, right-side bottom linkage 70R is pivotably connected to front frame assembly 12 at a right-side forward bottom linkage attachment point 72R and is pivotably connected to rear frame assembly 14 at a right-side rearward bottom linkage attachment point 74R. Similarly, left-side bottom linkage 70L is pivotably connected to rear frame assembly 14 at a left-side rearward bottom linkage attachment point 74L and is pivotably connected to front frame assembly 12 at a left-side frontward bottom linkage attachment point (not shown).

The bicycle frame design disclosed herein may be used with bicycle frames using conventional metal tubing (e.g., steel, aluminum, titanium) (welded and/or lugged); carbon fiber tubing (unified and/or lugged); monolithic carbon fiber lay-ups (e.g., monocoque), and/or virtually any other frame construction materials and/or techniques.

While bicycle frame 10 is depicted as having a somewhat conventional front triangle, other designs are equally valid, including designs without a distinct top tube or down tube and/or without a conventional seat tube. Likewise, while bicycle frame 10 has chain stays 28 and seat stays 50, other designs are equally valid, including designs with a single rear fork.

In general, suspension operation of bicycle frame 10 will remain the same even if the shapes of the front frame assembly or rear frame assembly are changed, provided: 1) the position of the rear wheel forkend 30 remains the same relative to the position of rearward shock attachment point 32; 2) the position of bottom bracket shell 16 remains the same relative to the position of forward shock attachment point 22; and 3) the lengths and attachment points of the top 60 and bottom 70 linkages remain the same. Parameters of the suspension may be modified by changing these relative positions and/or linkage lengths. In an example, bicycle frame 10 has a leverage ratio of 2.5, although virtually any leverage ratio is within the scope of this disclosure. In an example depicted in FIG. 6, top linkage 60 and bottom linkage 70 have angles (relative to ground) of 21.6 and 29 degrees, respectively, although virtually any linkage angles may be used to achieve virtually any desired instant center without departing from the scope of this disclosure. For example, an angle of top linkage 60 relative to ground at 0% sag may be approximately 16-26 degrees and an angle of bottom linkage 70 relative to ground at 0% sag may be approximately 24-34 degrees. In general, suspension parameters may be selected to enhance pedaling efficiency, limit pedal kickback, and maintain bump compliance while the drivetrain is under pedaling tension.

Furthermore, while bicycle frame 10 uses top linkage 60 and bottom linkage 70 to pivotably connect a unified front frame assembly (e.g., front frame assembly 12) to a unified rear frame assembly (e.g., rear frame assembly 14), other suspension linkages may be used in alternative embodiments. In alternative embodiments, a bicycle frame may not have separate front and rear frame assemblies. In such embodiments, a front and/or rear "triangle" of the frame may be non-rigid, non-unified with one or more inter-frame pivots (e.g., a pivot between the chain stay fork and the rear wheel forkend).

It will be understood that the configurations and/or approaches described herein are exemplary in nature, and that these examples are not to be considered in a limiting sense, because numerous variations are possible. The subject matter of the present disclosure includes all novel and non-obvious combinations and sub-combinations of the various configurations and/or approaches disclosed herein, as well as any and all equivalents thereof.

The invention claimed is:

1. A bicycle frame, comprising:
a front frame assembly including:
  a bottom bracket shell;
  a seat tube extending from the bottom bracket shell toward a saddle support; and
  a forward shock attachment point statically located on the seat tube between the bottom bracket shell and the saddle support; and
a rear frame assembly pivotably connected to the front frame assembly, the rear frame assembly including:
  a chain stay fork including a chain stay yoke and a chain stay extending from the chain stay yoke to a rear wheel forkend; and
  a rearward shock attachment point statically located on the chain stay yoke;
wherein the forward shock attachment point and the rearward shock attachment point cooperate to position a suspension shock between the front frame assembly and the rear frame assembly behind the seat tube.

2. The bicycle frame of claim 1, further comprising:
a top linkage pivotably connected to the front frame assembly and pivotably connected to the rear frame assembly; and
a bottom linkage pivotably connected to the front frame assembly and pivotably connected to the rear frame assembly.

3. The bicycle frame of claim 1, wherein the front frame assembly is a unified front triangle assembly.

4. The bicycle frame of claim 3, wherein the unified front triangle assembly further includes a top tube statically connected to the seat tube, a head tube statically connected to the top tube, and a down tube statically connected to the head tube and one or both of the seat tube and the bottom bracket shell.

5. The bicycle frame of claim 1, wherein the rear frame assembly is a unified rear triangle assembly.

6. The bicycle frame of claim 5, wherein the unified rear triangle assembly further includes a seat stay fork statically connected to the rear wheel forkend, and a bridge stay statically connected to the seat stay fork and the chain stay fork.

7. A bicycle frame, comprising:
a front frame assembly including:
  a bottom bracket shell; and
  a forward shock attachment point statically located relative to the bottom bracket shell; and
a rear frame assembly pivotably connected to the front frame assembly, the rear frame assembly including:
  a rear wheel forkend;
  a rearward shock attachment point statically located relative to the rear wheel forkend;
  a top linkage pivotably connected to the front frame assembly and pivotably connected to the rear frame assembly; and
  a bottom linkage pivotably connected to the front frame assembly and pivotably connected to the rear frame assembly;
wherein the forward shock attachment point and the rearward shock attachment point cooperate to position a suspension shock between the front frame assembly and the rear frame assembly.

8. The bicycle frame of claim 7, further comprising the suspension shock mounted to the forward attachment point and the rearward attachment point.

9. The bicycle frame of claim 7, wherein the bottom linkage is pivotably connected to the front frame assembly forward of the bottom bracket shell.

10. The bicycle frame of claim 7, wherein the bottom linkage passes under the bottom bracket shell.

11. The bicycle frame of claim 7, wherein the rear wheel forkend is configured to secure a through axle.

12. The bicycle frame of claim 7, further comprising a removable front derailleur hanger removably connected to a forward shock axle secured by the forward shock attachment point.

13. The bicycle frame of claim 7, wherein a distance between the forward shock attachment point and the rearward shock attachment point is approximately 160 mm eye to eye at 0% sag and approximately 140 mm fully compressed, and wherein the leverage ratio is approximately 2.5 thus providing 50 mm of vertical rear axle travel.

14. The bicycle frame of claim 7, wherein an angle of the top linkage relative to ground at 0% sag is approximately 16-26 degrees and an angle of the bottom linkage relative to ground at 0% sag is approximately 24-34 degrees.

15. The bicycle frame of claim 7, wherein the front frame assembly is a unified front triangle assembly.

16. The bicycle frame of claim 15, wherein the unified front triangle assembly further includes a seat tube statically connected to the bottom bracket shell, a top tube statically connected to the seat tube, a head tube statically connected to the top tube, and a down tube statically connected to the head tube and one or both of the seat tube and the bottom bracket shell.

17. The bicycle frame of claim 7, wherein the rear frame assembly is a unified rear triangle assembly.

18. The bicycle frame of claim 17, wherein the unified rear triangle assembly further includes a seat stay fork statically connected to the rear wheel forkend, a chain stay fork statically connected to the rear wheel forkend, and a bridge stay statically connected to the seat stay fork and the chain stay fork.

19. The bicycle frame of claim 18, wherein the unified rear triangle includes plural constituent parts bonded together.

20. A bicycle frame, comprising:

a front frame assembly including:

a bottom bracket shell;

a seat tube extending from the bottom bracket shell toward a saddle support; and a forward shock attachment point statically located on the seat tube between the bottom bracket shell and the saddle support; and a rear frame assembly pivotably connected to the front frame assembly, the rear frame assembly including:

a chain stay fork including a chain stay yoke and a chain stay extending from the chain stay yoke to a rear wheel forkend; and a rearward shock attachment point statically located on the chain stay yoke;

wherein the forward shock attachment point and the rearward shock attachment point cooperate to position a suspension shock between the front frame assembly and the rear frame assembly behind the seat tube and in front of a rear bicycle wheel.

\* \* \* \* \*